United States Patent [19]
Salmon

[11] Patent Number: 5,983,945
[45] Date of Patent: *Nov. 16, 1999

[54] WING TANK LINER

[75] Inventor: Robert F. Salmon, Margate, N.J.

[73] Assignee: The United States of America as represented by the Secretary of Transportation, Washington, D.C.

[ * ] Notice: Under 35 U.S.C. 154(b), the term of this patent shall be extended for 568 days.

[21] Appl. No.: 08/659,120

[22] Filed: Jun. 4, 1996

Related U.S. Application Data

[63] Continuation of application No. 08/450,177, May 25, 1995, abandoned, which is a continuation-in-part of application No. 08/139,678, Oct. 22, 1993, abandoned.

[51] Int. Cl.$^6$ .................................................... B64D 37/00
[52] U.S. Cl. .................... 137/899.2; 137/574; 244/135 R
[58] Field of Search .......................... 244/135 R, 135 B; 137/899.2, 574, 15

[56] References Cited

U.S. PATENT DOCUMENTS

| | | | |
|---|---|---|---|
| 2,041,450 | 5/1936 | Adams | 244/135 R |
| 2,322,104 | 6/1943 | Arcier et al. | 244/135 R |
| 2,736,356 | 2/1956 | Bender et al. | 244/135 B |
| 2,844,178 | 7/1958 | Coleman | 244/135 B |
| 4,624,426 | 11/1986 | Muscatell | 244/135 R |

*Primary Examiner*—A. Michael Chambers
*Attorney, Agent, or Firm*—Otto M. Wildensteiner

[57] ABSTRACT

A liner for aircraft fuel tanks which limits the amount of fuel that can be spilled in the event of a crash. The liner is made of neoprene rubber with nylon reinforcing threads or other light-weight flexible material and is suspended within the fuel tank from a frame or from the tank itself. In normal operation the liner in effect floats in the fuel and is not subject to major stresses during flight since it does not carry the weight of the fuel. The liner can be retrofitted into existing aircraft with only minor modifications to the internal hardware in the tanks. It includes a valve in its discharge port that is either fully open for normal use, or is fully closed by the pilot when a crash is inevitable. The entire system (i.e. liner, frame, valves, etc.) is very small and lightweight, thereby adding minimal weight and fuel capacity loss penalties. The system can reduce the spillage from a ruptured wing tank by as much as 98%.

35 Claims, 7 Drawing Sheets

WING TANK LINER

This is a Request for filing a continuation application under 37 CFR 1.62 of prior application Ser. No. 08/450,177, filed on May 25, 1995 entitled Wing Tank Liner, abandoned, which is a CIP of Ser. No. 08/139,678, filed Oct. 22, 1993, abandoned.

STATEMENT OF GOVERNMENT INTEREST

The present invention may be made or used by or on behalf of the United States Government for governmental purposes without the payment of any royalties thereon or therefor.

INTRODUCTION

Fire is the major cause of fatalities when an otherwise survivable aircraft crash occurs. Accident data indicate that the survivability rate of moderate aircraft accidents is related to the degree of success of the aircraft in containing its fuel. If there is a large release of fuel and a large fuel pool when the aircraft comes to rest, the survivability rate for the passengers is greatly reduced.

There are two major factors in this situation which are the prime causes of the fatalities. One is the development of a fuel mist, which is created when fuel is released from a ruptured fuel tank while the aircraft is still moving. If it is ignited, it forms a fireball that is attached to the aircraft. The second factor is the fuel which continues to spill from the ruptured tank after the aircraft comes to rest, which results in a sizable pool of fuel on the ground under the aircraft. This pool, if ignited, can develop into a very large and hot fire which engulfs the entire aircraft. Thus, there are two problems to be solved: One, reduce or eliminate the fuel mist fireball; and two, minimize the size of the fuel pool and the potential resulting fire. Anti-misting fuel can mitigate the fuel mist problem to a large extent. The present invention can further mitigate it by reducing the amount of fuel that can be released while the aircraft is still moving; the present invention also mitigates the fuel pool problem the same way—that is, by reducing the amount of fuel that can be lost in a crash.

Over the years a great deal of work has been done on methods of containing the fuel in a crash. Most of this work dealt with the structural design of the wing and fuel tanks, frangible fittings for the fuel system, installation of bladders in the tanks to improve the containment of the fuel, and use of reticulated foam to impede the spill rate of the fuel. Some of the modifications have been implemented in specialized aircraft. For example, helicopters have been using bladders and frangible fittings for about 25 years and these have been found to perform quite well. However, most of the containment proposals over the years are not readily adaptable to typical commercial transport aircraft. The modifications required for these designs are prohibitive in weight, cost, or reduction in fuel capacity, thus reducing the maximum range of the aircraft.

OBJECTS

Accordingly, it is an object of the present invention to provide a means of minimizing the fuel lost in a crash by an aircraft.

It is a further object of the present invention to provide such means that is effective when the aircraft is still moving down the runway or along the ground and when it has come to rest.

It is a further object to provide such a means that will not appreciably decrease either the range or the payload of the aircraft.

It is a further object to provide such a means that can be retrofitted into existing aircraft withought major changes to the existing fuel system.

It is a further object to provide such a means that can be used in either an inboard or an outboard fuel tank.

SUMMARY

Briefly, the present invention is a liner or a series of liners for aircraft fuel tanks. The liners are made of lightweight, flexible material and are open at the top. They are immersed in the fuel in the tank; the design of the system is such that they do not have to support the weight of the fuel during normal operation. There is a liner for each portion of the tank between anti-slosh bulkheads and for the portions between the end walls and anti-slosh bulkheads. The liners are either suspended from frames that are installed in the tanks for this purpose or are attached to the inside of the tank. Each liner has a valve in it for controlling the flow of fuel into and out of it; the valves are either fully open, for normal use, or fully closed, in preparation for a crash.

The liners sub-divide the fuel tank into a number of compartments; if the wing gets damaged, the amount of fuel that can be spilled is limited to that in the compartment that is punctured in the accident plus the fuel that is between the liners and the wing structure itself. This is usually such a small quantity of fuel that it is drained out before the aircraft slides or rolls to a stop.

DESCRIPTION OF THE PREFERRED EMBODIMENT

Figure 1:
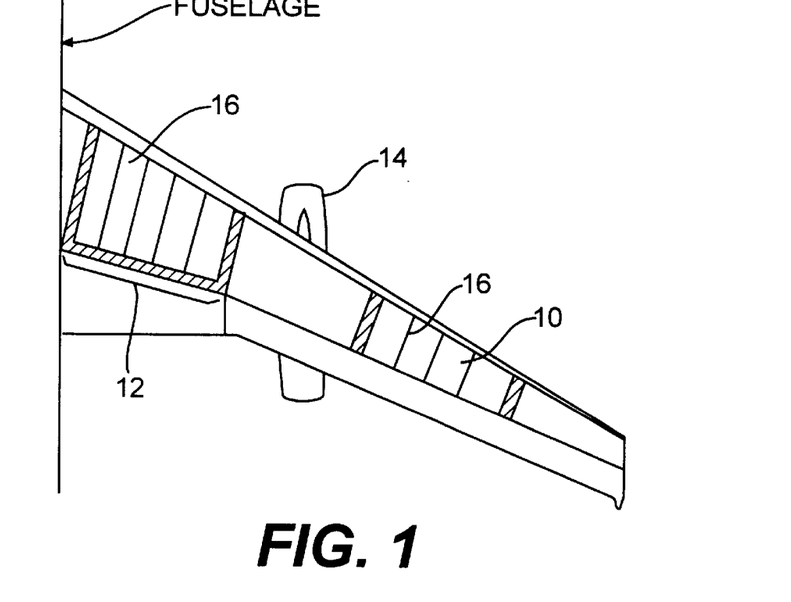
FIG. 1 shows the general layout of the wing tanks in a twin engine aircraft.

FIG. 1 shows the general layout of the wing tanks in a large twin engine aircraft. As can be seen, there is an outboard tank 10 and an inboard tank 12. Anti-slosh bulkheads 16 appear, in this view, to subdivide the tanks into a series of smaller tanks. However, that is not the case. As shown in FIG. 2a, bulkheads 16 rest on Z rib stiffeners 18. That is, the outboard fuel tank is comprised of bottom 20, which is the lower wing skin; forward wall 22; aft wall 24; inboard bulkhead 26; outboard bulkhead 28; and a top, not shown, which is the upper wing skin. Z rib stiffeners 18 are riveted to the inside of the top and bottom wing surfaces in order to stiffen the wing in the span-wise direction.

Anti-slosh bulkheads 16 are fastened to the inside surfaces of Z rib stiffeners 18 as shown in FIG. 2a, leaving a gap between bulkheads 16 and the bottom 20 of the tank. This allows fuel to completely drain out of the tank through a single fitting, not shown, at the inboard end of the tank. It also allows the tank to be filled through a single inlet, also not shown.

Figure 3:
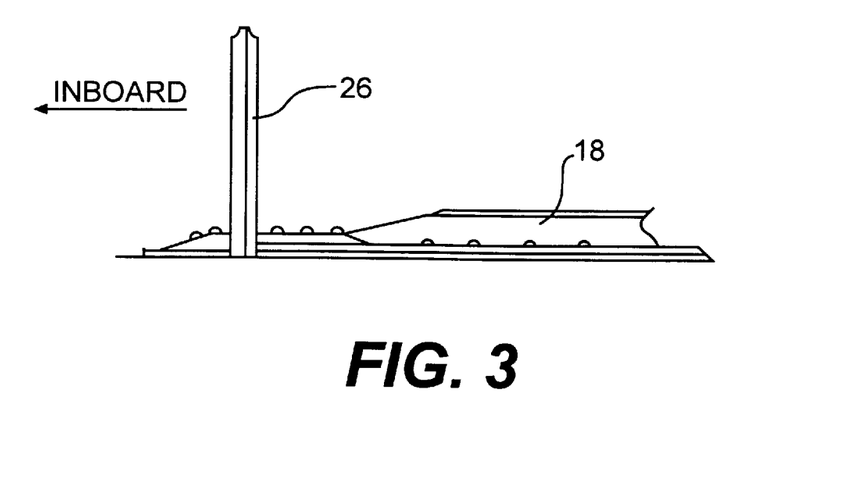
FIG. 3 shows the taper of the inboard ends of the Z rib stiffeners in the fuel tank.

At present, the inboard ends of bottom Z rib stiffeners 18 in both the inboard and the outboard tank are tapered as shown in FIG. 3. This prevents the ends from trapping an appreciable amount of fuel between Z rib stiffeners 18, which would render it unusable. Since they taper to a height of about ¾ inch, essentially all of the fuel in the tank can be used.

Thus as shown above, at the present time each wing fuel tank is a unitary volume; a rupture at any point will allow all of the fuel in the tank to drain out.

Figure 4:
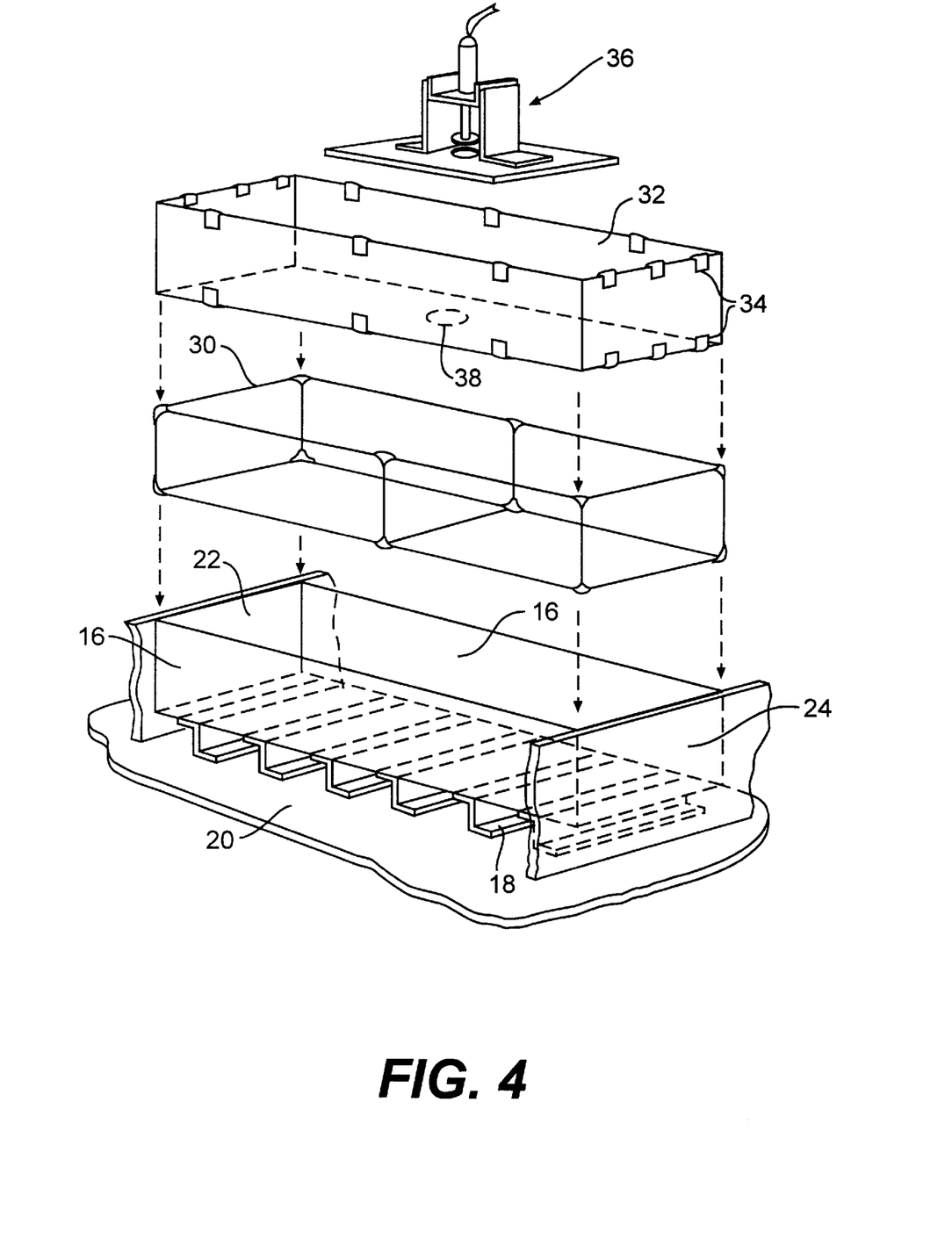
FIG. 4 is a schematic view of the liner of the present invention for an outboard fuel tank.

The present invention is shown schematically in FIG. 4, which shows a liner that is between two anti-slosh bulkheads 16. A lightweight framework 30 of aluminum tubing, for example, is placed in the space between the bulkheads and attached to Z rib stiffeners 18. Then liner 32 is placed inside framework 30 and held in place by means of tabs 34, which go over framework 30 and are fastened to liner 32.

Liner 32 includes valve assembly 36, which is fastened to the bottom of liner 32 and controls the flow into and out of port 38. Valve assembly 36 is a pneumatically operated poppet valve that is well known in the art; it has only two positions, full open and full closed. In the event of a crash valve assembly 36 is closed by the flight crew; at all other times it is in the full open position to allow unrestricted flow into and out of liner 32.

Figure 2:
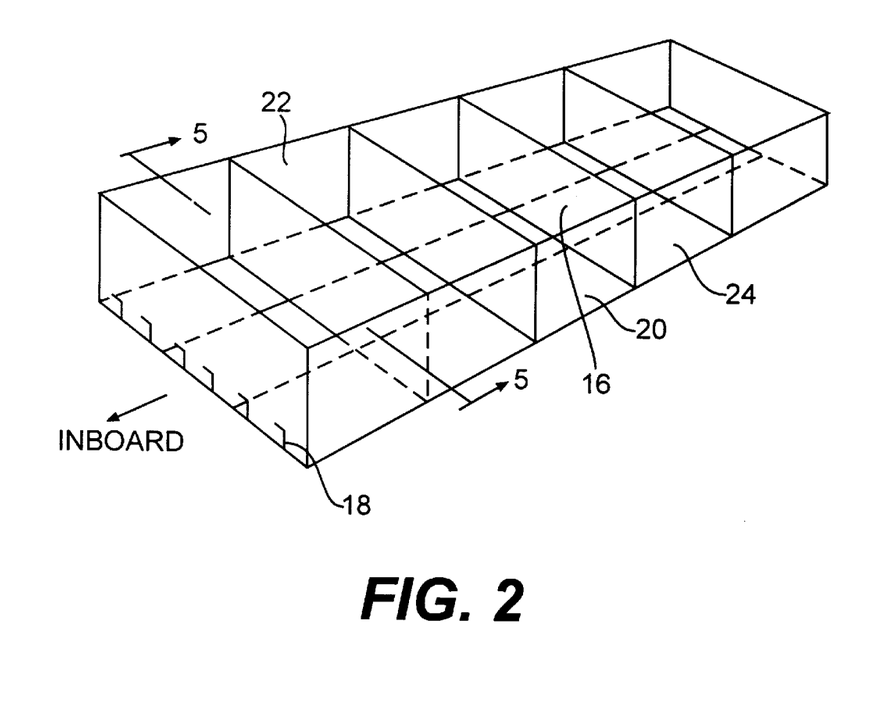
FIG. 2 is a perspective view of the interior of an outboard wing fuel tank.
Figure 2A:
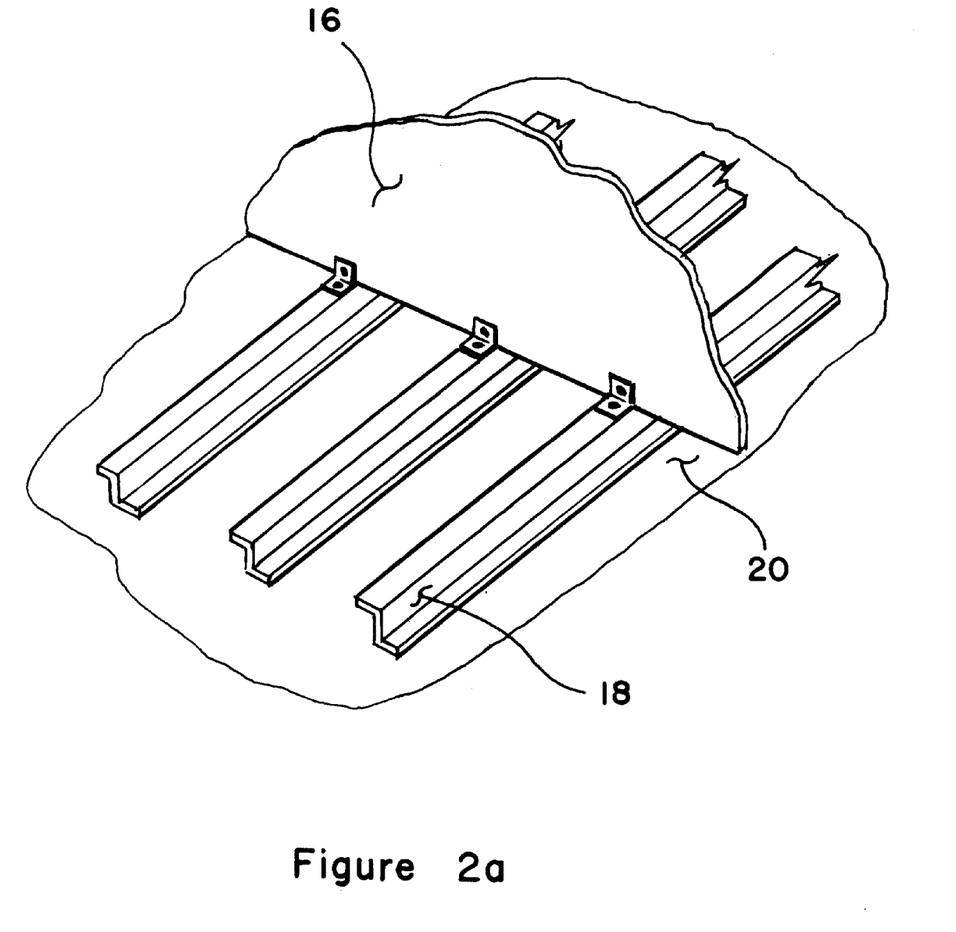
FIG. 2a shows the attachment of an anti-slosh baffle to the tops of Z rib stiffeners in the fuel tank.

There is a liner such as is shown in FIG. 4 between each pair of anti-slosh bulkheads 16, and between inboard end bulkhead 26 and its nearest anti-slosh bulkhead 16 as well as between outboard end bulkhead 28 and its nearest anti-slosh bulkhead 16 (see FIG. 2). Thus the wing tank contains a plurality of liners, each one open at the top and having a port in the bottom that can be closed by a valve.

Figure 5:
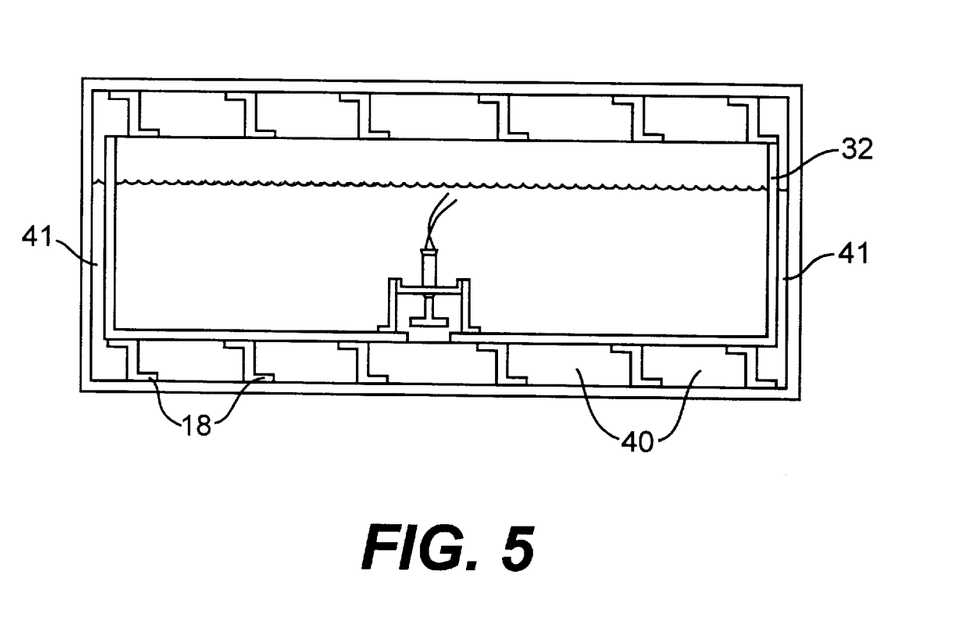
FIG. 5 is a cross section view of an outboard wing fuel tank with the liner in place, taken along line 5—5 in FIG. 2.

FIG. 5 is a cross section through the tank along line 5—5 in FIG. 2 showing the liner in place. As can be seen, there is fuel in the spaces 40 between Z rib stiffeners 18 and in spaces 41 between liner 32 and the forward and aft walls. Also, valve 36 is open. Thus liner 32 does not support the weight of the fuel during normal operation, and can be made of lightweight material. The preferred material is a neoprene rubber with nylon reinforcing threads on one half inch centers for tear resistance. This material weighs 0.113 pounds per square foot; its compatibility with fuel has been shown by immersing it in Jet A fuel for one year with no deterioration or change in characteristics. The material is a proprietary product obtained from Switlik Parachute Co. in Trenton, N.J.; it is currently used by Switlik to make life rafts and survival gear. Likewise, tabs 34 do not have to support more than the weight of liner 32 during normal operation and may be of the same lightweight material.

Figure 6:
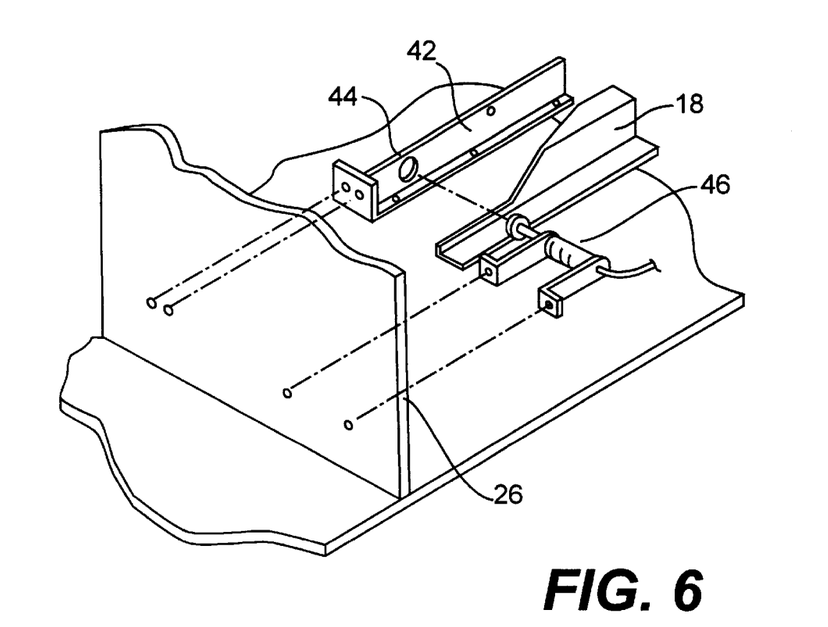
FIG. 6 shows the full-height extensions to the Z rib stiffeners.

As stated earlier, the inboard ends of existing Z rib stiffeners 18 are tapered to allow complete drainage of fuel from the tank. Since the amount of fuel in spaces 40 below the bottom of liner 32 between Z rib stiffeners 18 can be considerable, it is desirable to limit the amount that can be lost in the event of a crash. This is done by adding a full-height extension 42 as shown in FIG. 6 to the inboard end of every other Z rib stiffener 18 in both the inboard and the outboard tank. Extensions 42 are fastened to inboard end bulkhead 26 and tank bottom 20 as shown; they effectively raise the height of the inboard ends of Z rib extensions 18 to that of the rest of the stiffeners. Extensions 42 have a port 44 in them which allows complete drainage of fuel as in prior art tanks. However, also included is valve assembly 46 which can be closed by the flight crew to prevent flow through port 44. Valve assembly 46 is the same as valve assembly 36 in the bottoms of liners 32 and is closed at the same time as valve assemblies 36.

Figure 7:
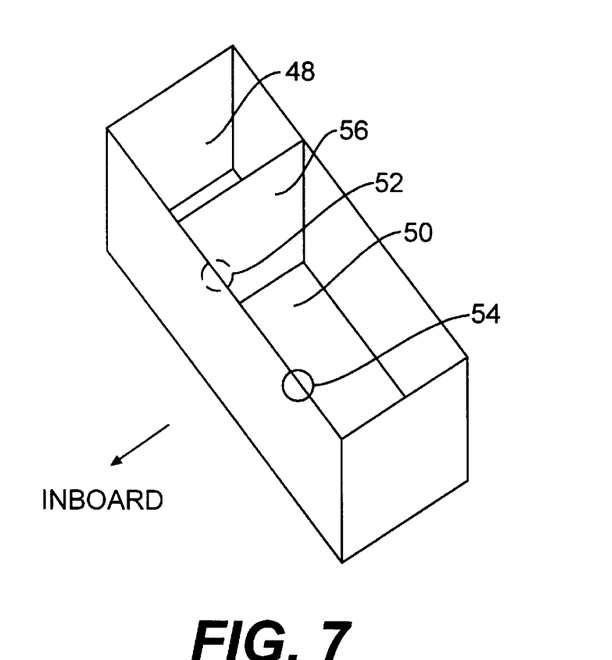
FIG. 7 shows the configuration of the present invention for an inboard wing fuel tank.

The design of the liner of the present invention for the inboard tanks is somewhat different, since these tanks are much larger—a tank near the wing root can contain as much as 3600 gallons, whereas the outboard tanks usually contain 450–500 gallons. As shown in FIG. 1, the anti-slosh bulkheads divide tank 12 into 5 equal sections (but still a unitary volume). The liners for each of these sections, as shown in FIG. 7, are preferably but not necessarily divided into forward compartment 48 and aft compartment 50. Port 52 in the bottom of forward liner compartment 48 and port 54 in the bottom of aft liner compartment 50 allow fuel into and out of the two compartments. Both of ports 52 and 54 include valve assemblies (not shown) such as valve assemblies 36 which can be closed by the pilot in the event of a crash. Forward compartment 48 is preferably sized to contain about ¼ as much fuel as aft compartment 50, since accident data show that the forward part of the wing sustains the bulk of the damage in an accident which results in wing damage.

The liners of the present invention may optionally have a partial cover or flap 23 as shown in FIG. 5. Flap 23 needs to cover only the forward 40% (approximately) of the liner. The reason for having such a flap is that when the airplane is decelerating during landing runout, the inertia of the fuel causes it to pile up against the front of the liner. Normally, the fuel level in the tank (and consequently in space 41) is low at the end of a flight. However, if the tank is relatively full and the pilot has valve 36 closed, piled-up fuel in the front of the liner could spill over the top of the front of the liner during runout and into space 41 between the liner and the tank wall. This would put more fuel in space 41 where it could spill out in the event of an accident. Flap 23 would prevent such spilling over the top during runout.

For the case of a liner as shown in FIG. 7 that is divided into compartments, each compartment should have a flap 23 over its forward portion.

There are Z rib stiffeners on the upper and lower wing surfaces in this area as well. Since compartments 48 and 50 communicate with each other by means of the space between the Z rib stiffeners on the wing lower surface, in normal operation the fuel levels in the two compartments are always the same and there is no pressure differential across liner portion 56 which separates the two compartments.

Because the inboard tank is much bigger than the outboard tank, it is feasible to eliminate the frame and attach the liner directly to the inside of the fuel tank. It can be suspended from the Z rib stiffeners on the upper wing surface and attached to the lower Z rib stiffeners for stability. There is usually a single access port for the entire tank and openings in the anti-slosh bulkheads that allow access to the entire tank. Thus a mechanic can enter the tank and install fittings in the Z rib stiffeners, then attach the liners to these fittings.

The liners of the present invention would function as follows when installed in an airplane. Assume that outboard tank 10 of FIG. 1 contains 374 gallons of a possible 467 gallons capacity. The depth of the fuel in the liner is 5.5 inches (i.e., the total depth of fuel in the tank is 8 inches, minus 2.5 inches, the height of the Z rib stiffeners). Therefore the amount of fuel in one liner compartment is 51.4 gallons. The total amount of fuel in the entire outboard tank in the space between Z ribs 18 is 117 gallons. With valves 36 closed, the potential fuel loss between Z ribs 18 is limited to the amount between 3 ribs (assuming that the tank rupture does not span more than one 3-rib set). For the average spacing between Z ribs, this amounts to approximately 27.3 gallons. The total amount of fuel which is between the tank walls and the liners above the Z ribs is approximately 8.6 gallons.

Assume that during the crash a 10 inch diameter hole is torn in the wing and that one compartment liner is ripped (assume also as above that the hole in the wing is within one 3-rib set). Also assume that the flight crew actuates all valves 36 and 46 and that they all function properly, thereby stopping flow through all ports. The total spillage will come from the ruptured liner, the fuel outside the liners above the Z ribs, and the fuel in one 3-rib set in the space below the height of the Z ribs (see FIG. 5). This total is:

| | | |
|---|---|---|
| Fuel within the liner | 51.4 | gallons |
| Fuel outside the liners | 8.6 | |
| Fuel between the ribs | 27.3 | |
| Total | 87.3 | gallons |

With the total height of the fuel in the tank at 8 inches, the flow rate of fuel through the hole varies from 23.1 gallons per second initially to 3.0 gallons per second for the last half inch of fuel. The total time for spilling of the entire 87.3 gallons would be 7.3 seconds. If the aircraft is assumed to slide for 9 seconds ("run-out time"), there should be no spillage pool under the aircraft when it stops except for some dripping from the wetted portion of the wing.

If the above tank did not have a liner, the scenario would be as follows. The spillage rate has the same range (23.1 gallons per second to 3.0 gallons per second), but there is more fuel to be spilled. At the instant of rupture there are 374 gallons of fuel in the tank, all of which would be lost. In the first 9 seconds, the run-out time, 184 gallons would be spilled, leaving 190 gallons in the tank when the aircraft came to rest which would form a pool under the aircraft. If the aircraft came to rest on an impervious surface, this fuel could form a pool 79.8 feet in diameter and 1/16 inch thick. If it were to catch on fire, it would engulf the entire aircraft.

A more severe case would result if the same size hole ripped two liners and two sets of Z ribs. In that case the total spillage would come from 2 liners, the fuel outside the liners, and the fuel in two sets of Z rib sections. This total would be:

| | | |
|---|---|---|
| Fuel in two liners | 102.8 | gallons |
| Fuel outside the liners | 8.6 | |
| Fuel between two sets of ribs | 54.6 | |
| Total | 166.0 | gallons |

Figure 8:
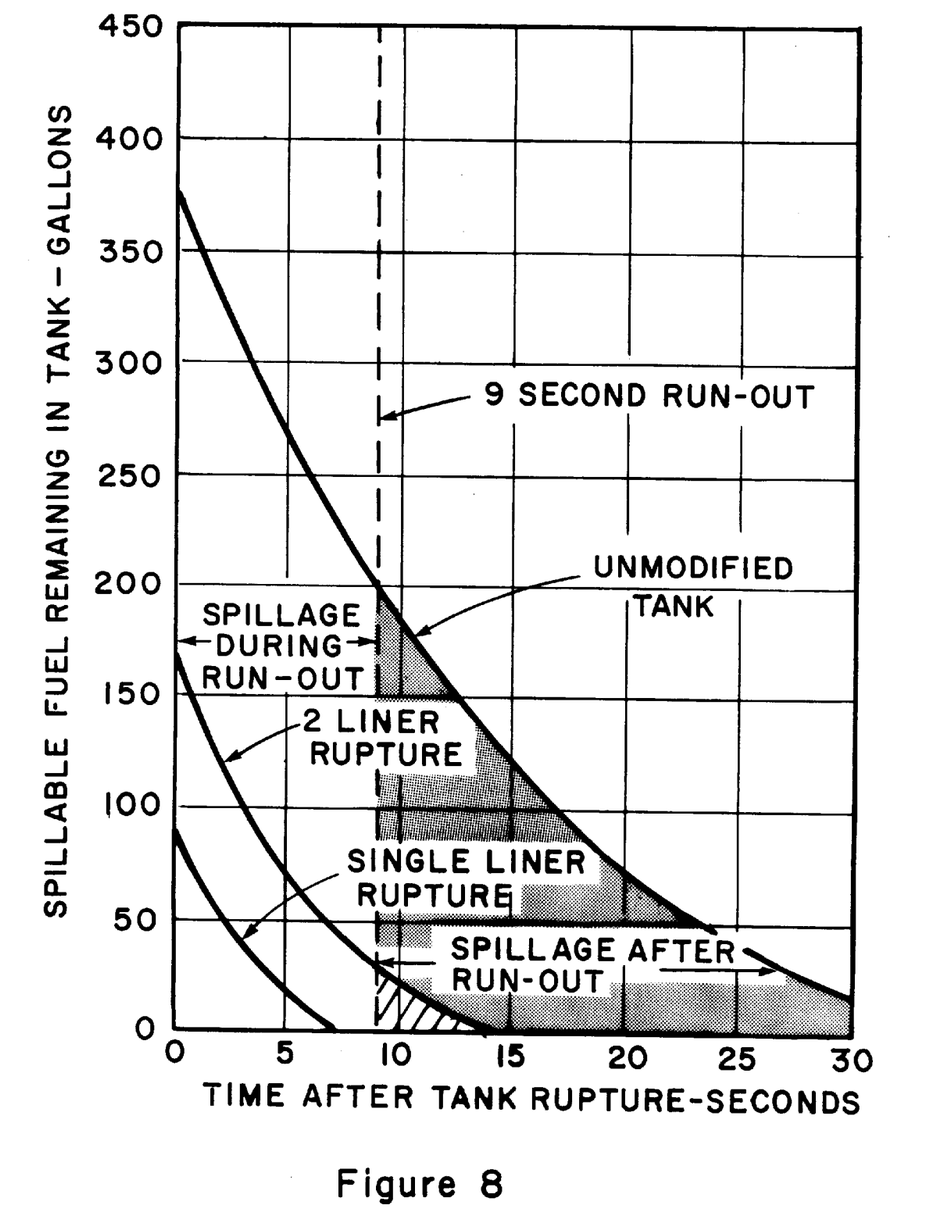
FIG. 8 shows the amount of fuel remaining in an outboard wing fuel tank as a function of time after rupture for a tank with and without liners.

The flow rate of the fuel would be as above. At the end of the run-out time there would be 21 gallons of fuel remaining in the tank, which would form a pool 26.2 feet in diameter on an impervious surface. These results are summarized in FIG. 8.

The performance of the present invention in an inboard tank is as follows. Assume that the tank is 70% filled and holds 2552 gallons of a possible 3646 gallons. If this tank sustained the same damage as the outboard tank, i.e. a 10 inch diameter hole, the tank without a liner would lose 382 gallons during the 9 second run-out. The remaining 2170 gallons could then create a pool 266 feet in diameter (again, assuming it is spilled onto an impervious surface). Obviously this would engulf the entire aircraft.

If the tank had liners as in the present invention that each held 1/5 of the total amount of fuel, each compartment would then hold 510 gallons. The total amount of fuel that could be spilled from the 10 inch diameter hole is:

| | | |
|---|---|---|
| Fuel in liner | 434.5 | gallons |
| Fuel outside liners | 124.7 | |
| Fuel between the ribs | 27.3 | |
| Total | 586.5 | gallons |

Figure 9:
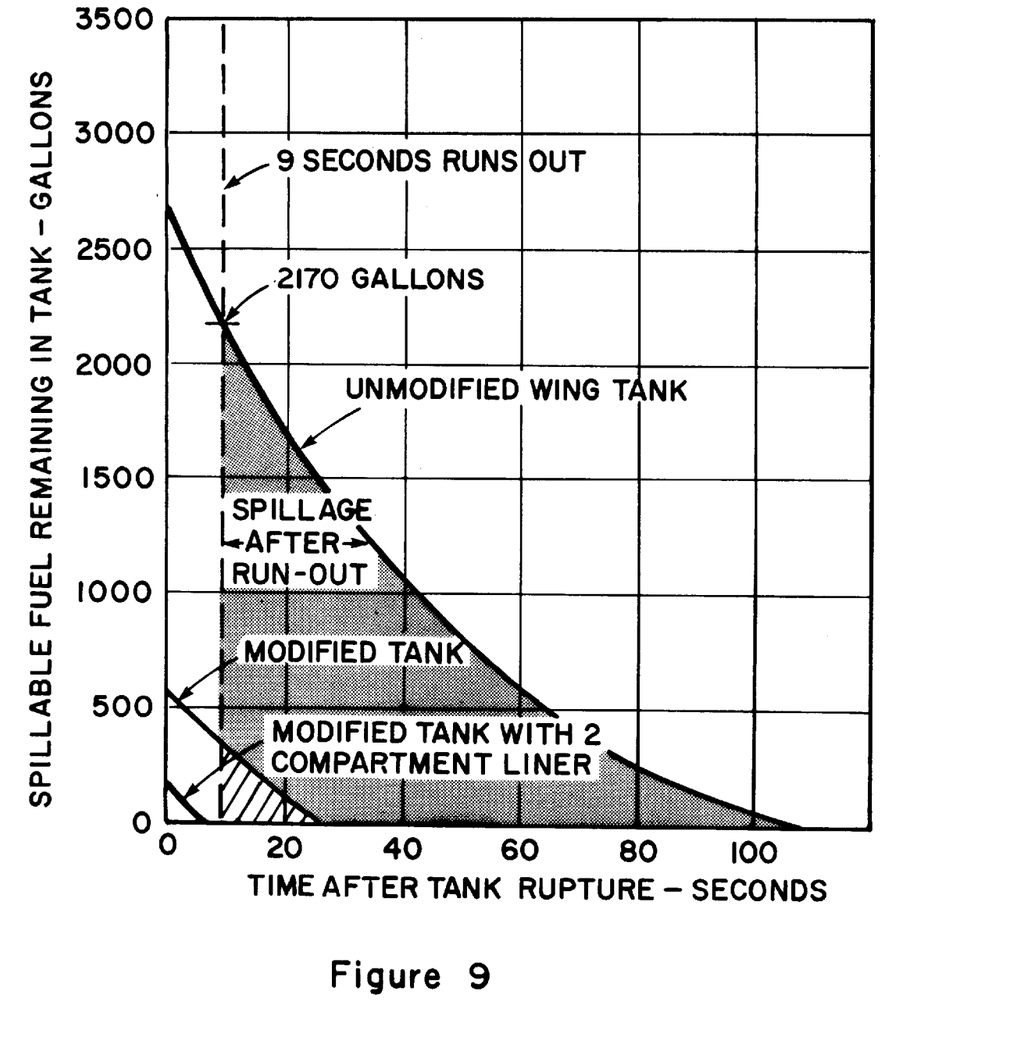
FIG. 9 shows the amount of fuel remaining in an inboard wing fuel tank as a function of time after rupture for a tank with and without liners.

Again, during the 9 second run-out 279 gallons would be lost, and the remaining 307 gallons could form a pool 100 feet in diameter under the aircraft. This is a smaller pool than with the unmodified tank, but it is still sufficient to engulf almost the entire aircraft. For this reason it is recommended that the compartments be subdivided as shown in FIG. 7 into a forward compartment and an aft compartment. Under this scenario, the total fuel that can be spilled from the forward compartment is 213 gallons. With only 213 gallons that could be spilled, all of it would be spilled during the run-out; the only fuel under the aircraft would be that which dripped off the wetted part of the wing. This is summarized in FIG. 9.

The weight of a complete liner system as described above would be approximately 385 pounds for a Boeing 707 class aircraft and it would displace about 44 gallons of fuel. Thus the weight and fuel loss penalties are slight, particularly in view of the increase in survivability that such a system provides.

The present invention has so far been described as a retrofit to an existing aircraft; obviously it could also be incorporated in new aircraft as they are built. This would eliminate the need for Z rib extensions 42 in the outboard tanks, although ports 44 and valves 46 would still need to be included.

While the present invention has been described with respect to a large wing tank for a transport aircraft, it obviously could also be used in the wing tank of a much smaller craft. Further, it could be used in a tank that did not have anti-slosh bulkheads, in which case it would be a single liner having a single port and valve in it. Such a configuration would provide protection only against accidents that did little more than just puncture the wing outer surface, since any appreciable penetration would also rip the liner.

I claim:

1. The method of limiting loss from an airplane wing tank in the event of an accident which comprises:
   installing a liner in the fuel tank, said liner being made of light-weight fuel impervious material that is spaced from the walls of the tank and is immersed in the fuel within the tank.

2. The method of claim 1 further comprising suspending said liner in the tank.

3. The method of claim 2 further comprising providing a cover over the forward portion of said liner.

4. A fuel-spill limiting device for the wing fuel tank of an airplane comprising a liner for said fuel tank, said liner comprising a thin sheet of flexible fuel-impervious material spaced from said tank walls and immersed in the fuel within said tank.

5. A device as in claim 4 wherein said liner is open at the top.

6. A device as in claim 5 wherein said liner is suspended in said tank.

7. A device as in claim 6 wherein said liner is immersed in the fuel in said tank.

8. A device as in claim 7 further including a port in said liner and a valve in said liner for controlling the flow of fuel through said port.

9. A device as in claim 8 wherein said valve has only two positions.

10. A device as in claim 9 wherein said positions are fully open and fully closed.

11. A device as in claim 10 wherein said liner is placed between anti-slosh bulkheads in said tank.

12. A device as in claim 10 wherein said liner is placed between the end bulkheads and the adjacent anti-slosh bulkheads in said tank.

13. A device as in claim 7 wherein said liner is made of neoprene rubber.

14. A device as in claim 13 wherein said neoprene rubber includes nylon reinforcing threads.

15. A device as in claim 7 wherein said liner is subdivided into at least two independent compartments.

16. A device as in claim 15 wherein each compartment has a port and a valve for controlling the flow of fuel through said port.

17. A device as in claim 16 wherein said compartments are of unequal size.

18. A device as in claim 17 wherein the smaller compartment is adjacent the leading edge of the wing.

19. A device as in claim 10 wherein each of said independent compartments has a cover over its forward portion.

20. A device as in claim 5 further including a frame within said tank for supporting said liner.

21. A device as in claim 20 wherein said liner is suspended from said frame.

22. A device as in claim 4 wherein said liner has a cover over its forward portion.

23. In an aircraft wing fuel tank including anti-slosh bulkheads within said tank, the improvement comprising liners between said anti-slosh bulkheads, said liners being spaced from said anti-slosh bulkheads and the tank walls and immersed in the fuel within said tank.

24. The fuel tank of claim 23 further including liners between the end bulkheads and the adjacent anti-slosh bulkheads.

25. The fuel tank of claim 24 wherein said liners are suspended in said fuel tank.

26. The fuel tank of claim 20 wherein said liners are immersed in the fuel in said tank.

27. The fuel tank of claim 26 wherein said liners are open at the top.

28. The fuel tank of claim 27 wherein said liners have a port and a valve for controlling the flow of fuel through said port.

29. The fuel tank of claim 27 wherein said liners are subdivided into at least two independent compartments.

30. A fuel tank as in claim 29 wherein each of said independent compartments has a cover over its forward portion.

31. The fuel tank of claim 29 wherein said compartments have an unequal volumetric ratio.

32. The fuel tank of claim 31 wherein the smaller compartment is adjacent the leading edge of the wing.

33. The fuel tank of claim 32 wherein each of said compartments has a port and a valve for controlling the flow of fuel through said port.

34. The fuel tank of claim 33 wherein said liners are made of neoprene rubber.

35. The fuel tank of claim 34 wherein said neoprene rubber includes nylon reinforcing threads.

* * * * *